United States Patent
Ge et al.

(10) Patent No.: US 10,671,140 B2
(45) Date of Patent: Jun. 2, 2020

(54) METHOD AND DEVICE FOR REDUCING POWER CONSUMPTION OF MOBILE TERMINAL

(71) Applicant: Beijing Xiaomi Mobile Software Co., Ltd., Beijing (CN)

(72) Inventors: Weiyan Ge, Beijing (CN); Xiaolong Zi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/144,095

(22) Filed: Sep. 27, 2018

(65) Prior Publication Data

US 2019/0101970 A1  Apr. 4, 2019

(30) Foreign Application Priority Data

Sep. 30, 2017  (CN) .......................... 2017 1 0914322

(51) Int. Cl.
*H04W 52/02* (2009.01)
*G08C 17/00* (2006.01)
(Continued)

(52) U.S. Cl.
CPC .......... *G06F 1/3203* (2013.01); *G06F 1/1635* (2013.01); *G06F 1/1698* (2013.01);
(Continued)

(58) Field of Classification Search
CPC .......... H04W 52/028; H04W 52/0216; H04W 88/02; H04W 52/0277; H04W 76/10;
(Continued)

(56) References Cited

U.S. PATENT DOCUMENTS 9,072,048 B2 *  6/2015  Zhang ............... H04W 52/0216
9,264,994 B2 *  2/2016  Lee ................... H04W 52/0216
(Continued)

FOREIGN PATENT DOCUMENTS

CN     105407521 A     3/2016
CN     107493597 A     12/2017

OTHER PUBLICATIONS

Extended European Search Report dated Feb. 5, 2019 in Patent Application No. 18198025.1, 10 pages.
Chinese Office Action dated Feb. 3, 2020 in Chinese Patent Application No. 201710914322.0.

Primary Examiner — Gary Lafontant
(74) Attorney, Agent, or Firm — Oblon, McClelland, Maier & Neustadt, L.L.P.

(57) ABSTRACT

The present disclosure relates to a method and an apparatus for reducing power consumption of a terminal device. In some embodiments, the apparatus includes processing circuitry and interface circuitry. In various embodiments, the terminal device receives wireless communication service from a network. The processing circuitry releases wireless network connection of the terminal device from the network in response to an instruction for reducing the power consumption of the terminal device. The processing circuitry further adjusts a subset of communication parameters from first settings to second settings to reduce the power consumption of the terminal device. The communication parameters are associated with a baseband processing device in the terminal device. The processing circuitry also reestablishes the wireless network connection of the terminal device to the network. When the wireless network connection is being reestablished, the interface circuitry sends the adjusted communication parameters to an access device in the network.

20 Claims, 10 Drawing Sheets

(51) Int. Cl.
*G06F 1/3203* (2019.01)
*G06F 1/16* (2006.01)

(52) U.S. Cl.
CPC ..... *H04W 52/028* (2013.01); *H04W 52/0274* (2013.01); *H04W 52/0277* (2013.01); *H04W 52/0283* (2013.01); *Y02D 70/00* (2018.01); *Y02D 70/20* (2018.01)

(58) Field of Classification Search
CPC . H04W 36/26; H04W 52/02; H04W 52/0241; H04W 52/0261; H04W 76/28; H04W 24/02; H04W 52/0235; G06F 1/3296; G06F 21/35; G06F 1/3203; G06F 1/3206; G06F 1/3234; G06F 1/3246; G06F 1/3253; G06F 1/325; Y02D 70/24
See application file for complete search history.

(56) References Cited

U.S. PATENT DOCUMENTS

| | | | |
|---|---|---|---|
| 2012/0122511 A1 | 5/2012 | Antonio et al. | |
| 2014/0157017 A1* | 6/2014 | Zhang | H04B 7/0452 713/320 |
| 2014/0321304 A1* | 10/2014 | Yu | H04L 5/00 370/252 |
| 2016/0029309 A1* | 1/2016 | Kim | H04W 52/0258 370/311 |
| 2016/0295447 A1 | 10/2016 | Braun et al. | |
| 2017/0013515 A1* | 1/2017 | Bangolae | H04W 52/0235 |

* cited by examiner

METHOD AND DEVICE FOR REDUCING POWER CONSUMPTION OF MOBILE TERMINAL

CROSS-REFERENCE TO RELATED APPLICATION

This application is based upon and claims the priority to the Chinese patent application No. 201710914322.0 filed on Sep. 30, 2017, the entire contents of which are incorporated herein by reference.

TECHNICAL FIELD

The present disclosure relates to the field of wireless communication technologies.

BACKGROUND

With the development of science and technology, the functions of mobile terminals are getting more and more diverse. Correspondingly, the power consumption of mobile terminals is also getting higher and higher.

In the related art, a method for reducing power consumption of the mobile terminal generally includes: changing a parameter of a peripheral device of the mobile terminal (for example, lowering brightness of the screen or decreasing volume of the speaker), cleaning up application programs running in the background of the mobile terminal, and the like.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to aspects of the present disclosure, a method and an apparatus for reducing power consumption of a terminal device are provided. In some embodiments, the apparatus includes processing circuitry and interface circuitry. In various embodiments, the terminal device receives wireless communication service from a network. The processing circuitry releases wireless network connection of the terminal device from the network in response to an instruction for reducing the power consumption of the terminal device. The processing circuitry further adjusts a subset of communication parameters from first settings to second settings to reduce the power consumption of the terminal device. The communication parameters are associated with a baseband processing device in the terminal device. The processing circuitry also reestablishes the wireless network connection of the terminal device to the network. When the wireless network connection is being reestablished, the interface circuitry sends the adjusted communication parameters to an access device in the network.

In some embodiments, the processing circuitry detects a present battery capacity of the terminal device, and adjusts the subset of the communication parameters according to the present battery capacity. In some example, the processing circuitry adjusts a number of the subset of the communication parameters according to the present battery capacity, and the number of the subset of the communication parameters is negatively correlated to the present battery capacity.

In some embodiments, after reestablishing the wireless network connection of the terminal device to the network, the processing circuitry detects a present battery capacity. When the present battery capacity is determined to be greater than a preset battery threshold, the processing circuitry releases the wireless network connection of the terminal device from the network, and restores the subset of the communication parameters to the respective first settings. Further, the processing circuitry reestablishes the wireless network connection of the terminal device to the network. When the wireless network connection is being reestablished, the interface circuitry sends the restored communication parameters to the access device.

In various embodiments, the subset of the communication parameters used by the terminal device to communicate with the network comprises at least one of: a first parameter indicative of a number of operable antennas that are configured to communicate with the network, a second parameter associated with carrier aggregation that combines multiple carriers to receive data from and send data to the network, a third parameter indicative of a multiple-input multiple-output characteristic that controls a number of data streams received and sent by the operable antennas, a fourth parameter indicative of a data throughput rate of the terminal device, and a fifth parameter indicative of a communication protocol version used by the terminal device.

In some embodiments, when the subset of the communication parameters includes the first parameter, the processing circuitry reduces the number of the operable antennas. When the subset of the communication parameters includes the second parameter, the processing circuitry disables the carrier aggregation. When the subset of the communication parameters includes the third parameter, the processing circuitry reduces the number of data streams received and sent by the operable antennas. When the subset of the communication parameters includes the fourth parameter, the processing circuitry reduces the data throughput rate of the terminal device. When the subset of the communication parameters includes the fifth parameter, the processing circuitry lowers the communication protocol version.

In some embodiments, releasing the wireless network connection includes sending a detach request to the access device requesting that the terminal device is to be detached from the network, receiving a detach accept message from the access device, and receiving a connection release message from the access device.

In some embodiments, sending the adjusted communication parameters includes receiving, from the access device, a request to obtain the communication parameters, acquiring the adjusted communication parameters, and sending the adjusted communication parameters to the access device.

In some embodiments, after determining the number of the subset of the communication parameters, the processing circuitry determines the subset of the communication parameters to be adjusted based on power consumption levels associated with operating the baseband processing device according to the respective communication parameters.

In some examples, a relationship between the present battery capacity and the number of subset of the communication parameters to be adjusted is stored in the terminal device.

Aspects of the disclosure also provide a non-transitory computer-readable storage medium storing instructions which when executed by a computer cause the computer to perform the method for reducing power consumption of a terminal device.

It should be understood that both the foregoing general description and the following detailed description are exemplary and explanatory only and are not restrictive of the disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

FIG. 3-1 is a flow chart illustrating another method for reducing power consumption of a mobile terminal according to an exemplary embodiment;

FIG. 3-2 is a flow chart illustrating a method for a mobile terminal to release network connection with an access network according to an exemplary embodiment;

FIG. 3-3 is a flow chart illustrating a method for a mobile terminal to reconnect to an access network according to an exemplary embodiment;

FIG. 4-1 is a block diagram illustrating a device for reducing power consumption of a mobile terminal according to an exemplary embodiment;

FIG. 4-2 is a block diagram illustrating an adjusting module according to an exemplary embodiment;

FIG. 4-3 is a block diagram illustrating another device for reducing power consumption of a mobile terminal according to an exemplary embodiment;

FIG. 4-4 is a block diagram illustrating an adjusting module according to an exemplary embodiment;

FIG. 4-5 is a block diagram illustrating a first releasing module according to an exemplary embodiment;

FIG. 4-6 is a block diagram illustrating a first processing module according to an exemplary embodiment; and FIG. 5 is a block diagram illustrating a mobile terminal according to an exemplary embodiment.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Descriptions will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
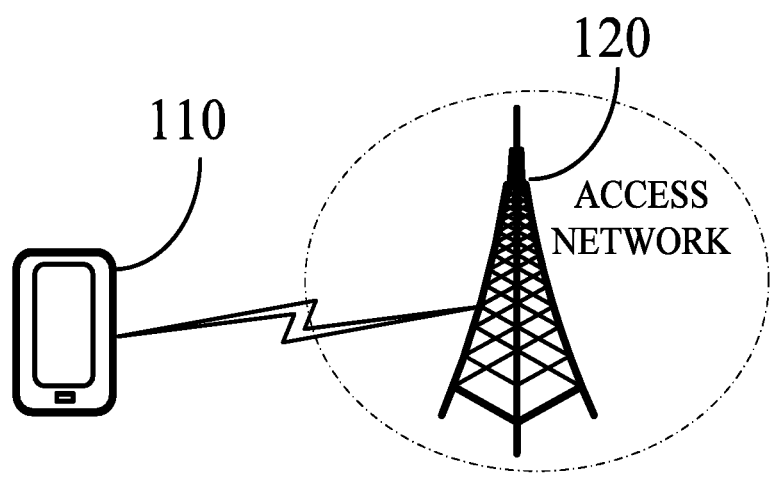
FIG. 1 is a schematic diagram illustrating an implementation environment involved in a method for reducing power consumption of a mobile terminal according to an exemplary embodiment.

FIG. 1 is a schematic diagram of an implementation environment involved in a method for reducing power consumption of a mobile terminal (or a terminal device) according to an exemplary embodiment. The implementation environment may include: a mobile terminal 110 and an access network device 120 (or an access device 120). The mobile terminal 110 may be a smartphone, a tablet computer, a multimedia player, an e-reader, a wearable device, or the like. The mobile terminal 110 may be connected to an access network through the access network device 120, and the access network may be a part of the telecommunication wide area network. In an example, the access network is part of a network that provides wireless communication service to the mobile terminal. After the mobile terminal is connected to the access network, for example, via wireless network connection, the mobile terminal 110 may obtain related services from the core network. The telecommunication wide area network can support different standard communication systems. For example, the communication system may be a Long Term Evolution (LTE) system, a Time Division Synchronous Code Division Multiple Access (TD-SCDMA) System or a Wideband Code Division Multiple Access (WCDMA) system. In the LTE system, the access network device 120 may be an evolved NodeB (eNodeB); and in the TD-SCDMA or WCDMA systems, the access network device 120 may be a radio network controller (RNC).

Figure 2:
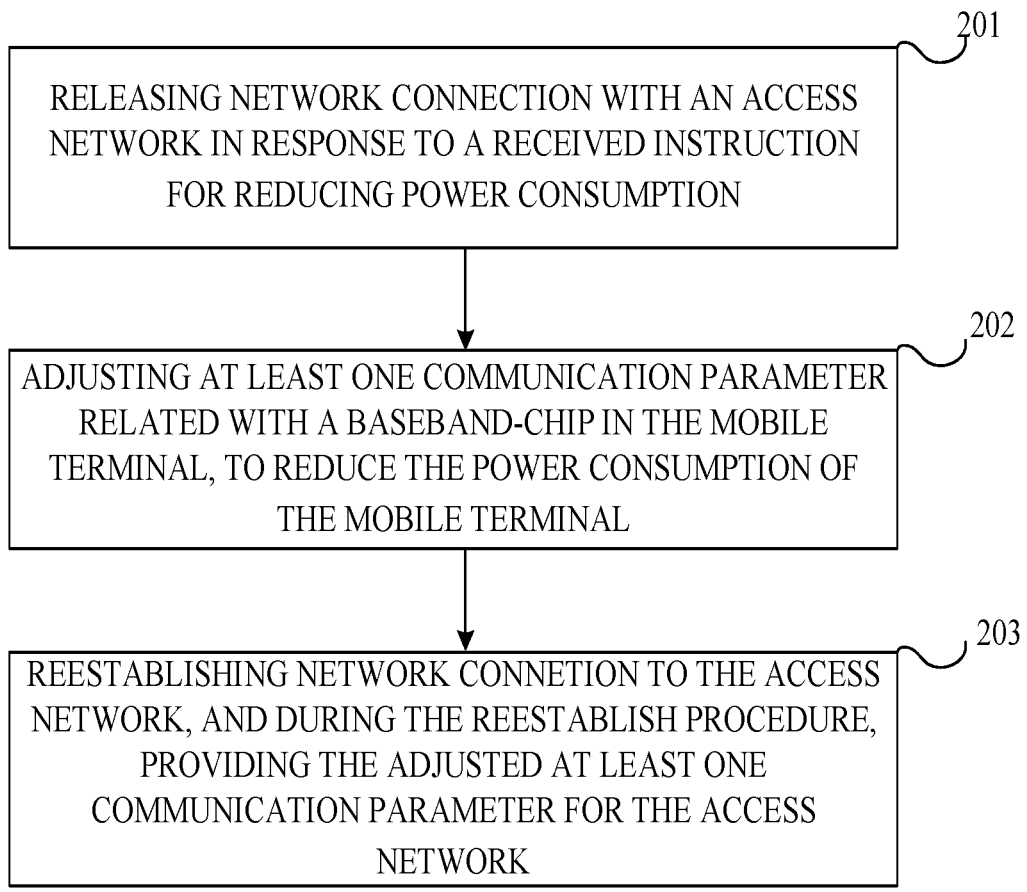
FIG. 2 is a flow chart illustrating a method for reducing power consumption of a mobile terminal according to an exemplary embodiment.

FIG. 2 is a flow chart illustrating a method for reducing power consumption of a mobile terminal according to an exemplary embodiment. The method may be applied to the mobile terminal 110 shown in FIG. 1. As shown in FIG. 2, the method may include the following steps.

In Step 201, network connection with an access network is released in response to a received instruction for reducing power consumption. In an example, the network connection is a wireless network connection.

The instruction for reducing power consumption may be triggered automatically by the mobile terminal according to a battery level of the mobile terminal, or may be initiated by a user actively.

In Step 202, a baseband-chip related communication parameter in the mobile terminal is adjusted, to reduce the power consumption of the mobile terminal. In some embodiments, a baseband processing device in the mobile terminal includes a baseband-chip. In some examples, a baseband-chip performs signal modulation, encoding, and the like in the mobile terminal.

The baseband-chip related communication parameter may include at least one of the number of operable antennas, a carrier aggregation function, a multiple-input multiple-output parameter, a throughput rate (or a data throughput rate) of the mobile terminal, and a communication protocol version. In an example, the operable antennas send data to and receive data from an access network. In an example, carrier aggregation refers to combining multiple carriers to receive data from and send data to an access network. In an example, a multiple-input multiple-output parameter controls a number of data streams received and sent by the operable antennas. In some examples, a subset of communication parameters is adjusted from first settings to second settings.

In Step 203, the access network is reconnected, and during the connecting process, the adjusted communication parameter is sent to the access network device of the access network.

Since after the mobile terminal is reconnected to the access network, the mobile terminal exchanges data with the access network device according to the adjusted communication parameter, the power consumption of the baseband chip can be reduced, and in turn, the power consumption of the mobile terminal can be reduced.

Accordingly, in the method for reducing power consumption of a mobile terminal provided by the embodiment of the present disclosure, the mobile terminal releases network connection with an access network, and then adjusts a baseband-chip related communication parameter, to reduce the power consumption of the baseband chip in the mobile terminal. In some examples, multiple baseband-chip related communication parameters are adjusted. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Figures 1, 3:
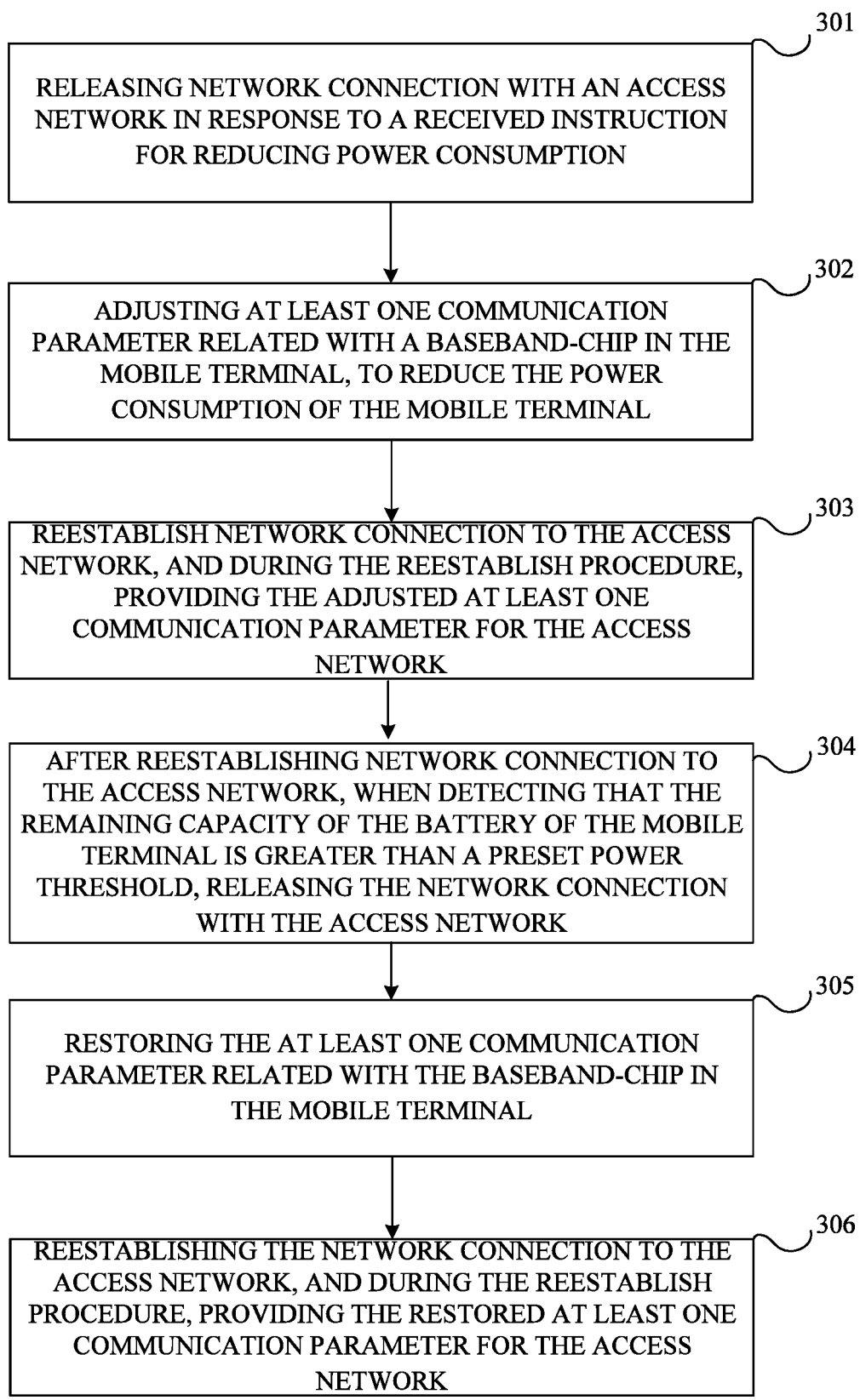
Figures 2, 3:
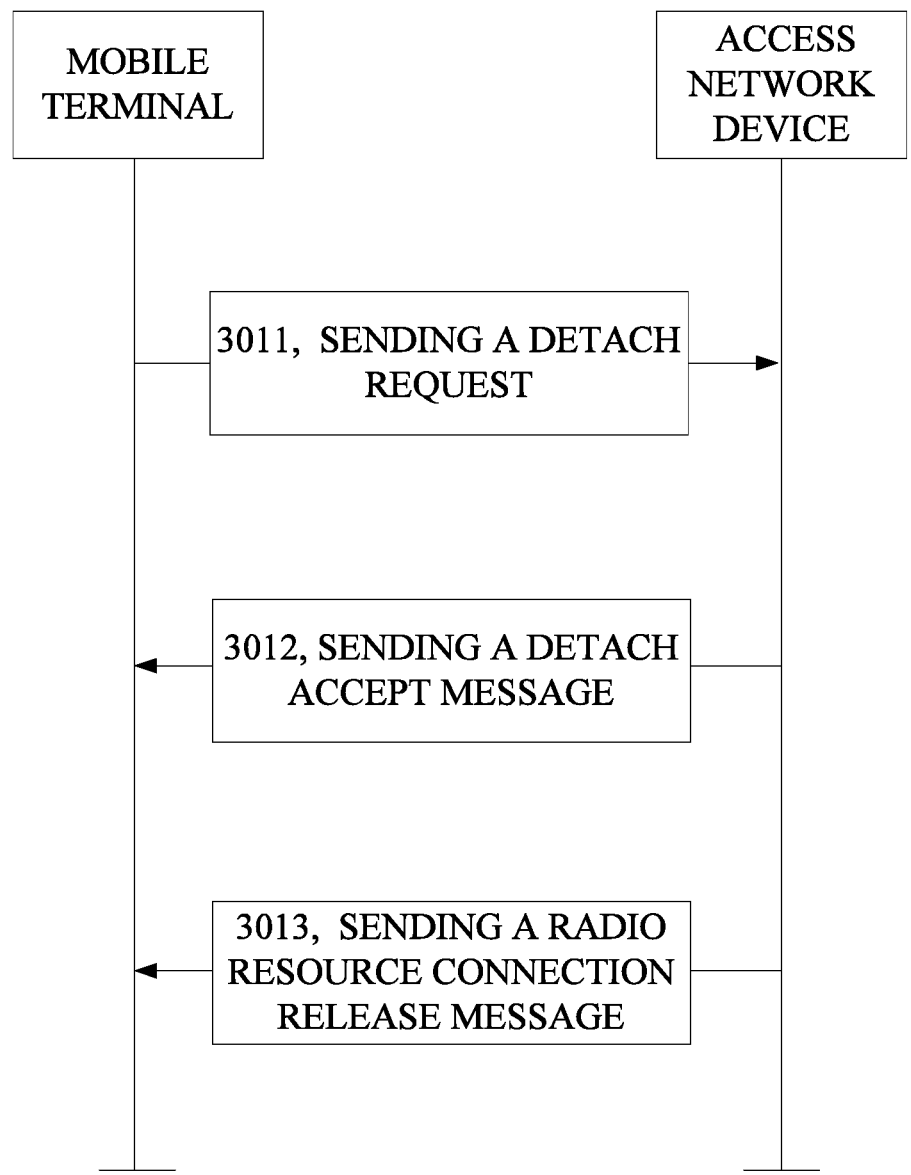
Figure 3:
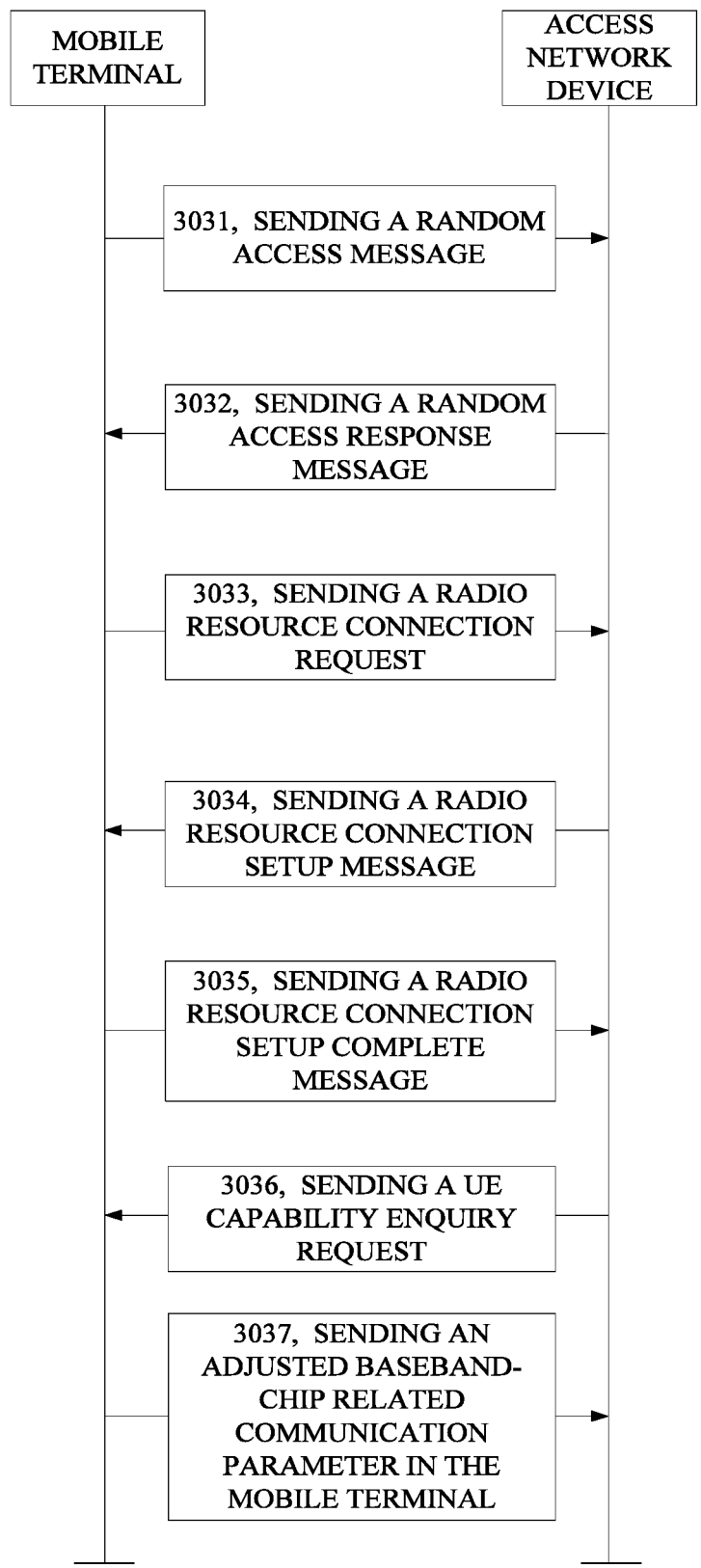

FIG. 3-1 is a flow chart of another method for reducing power consumption of a mobile terminal according to an exemplary embodiment. The method is applied to the mobile terminal 110 shown in FIG. 1. As shown in FIG. 3-1, the method may include the following steps.

In Step 301, network connection with an access network is released in response to a received instruction for reducing power consumption.

Since the power consumption of the baseband chip in the mobile terminal is relatively high, when the mobile terminal receives the instruction for reducing power consumption, the power consumption of the baseband chip can be reduced by adjusting a baseband-chip related communication parameter. Since the mobile terminal has reported the communication parameter of its baseband chip when the mobile terminal was connected to the access network, the access network device in the access network exchanges data with the mobile terminal according to the communication parameter reported by the mobile terminal. Therefore, in order to ensure the normal data exchange between the mobile terminal and the access network device, the mobile terminal may release the network connection with the access network before adjusting the baseband-chip related communication parameter.

In an embodiment of the present disclosure, in one aspect, the instruction for reducing power consumption may be triggered by the mobile terminal according to a battery level (or a present battery capacity) of the mobile terminal. For example, the mobile terminal may detect its battery level in real time or periodically. When the mobile terminal detects that its battery level falls below a low battery threshold, the mobile terminal may trigger the instruction for reducing power consumption. Alternatively, the mobile terminal may also determine a usable duration of the current battery level according to the current battery level and the current power consumption of the system in the mobile terminal. When the usable duration is less than a preset duration threshold, the mobile terminal may trigger the instruction for reducing power consumption. The low battery threshold and the preset duration threshold may be previously configured in the mobile terminal or may be set by the user autonomously, which is not limited in the embodiment of the present disclosure.

On the other hand, the instruction for reducing power consumption may also be triggered by the user. When the user wishes to reduce the power consumption of the mobile terminal, the instruction for reducing power consumption may be triggered by a preset operation, which may be a click operation, a slide operation or a voice operation, etc., which is not limited in the embodiment of the present disclosure.

As an example, it is assumed that the instruction for reducing power consumption is triggered according to the battery level of the mobile terminal, and the low battery threshold is 20%. When the mobile terminal detects that the battery level of the mobile terminal is less than 20%, the instruction for reducing power consumption may be triggered. Alternatively, when the user wishes to reduce the power consumption of the mobile terminal, the user may trigger the mobile terminal to display a power management interface through a click operation (for example, clicking an icon for setup), and the power management interface may display an icon of a power saving mode switch. When the user performs a click operation on the icon of the power saving mode switch, the mobile terminal may receive the instruction for reducing power consumption triggered by the user.

FIG. 3-2 is a flow chart illustrating a method for a mobile terminal to release network connection with an access network according to an exemplary embodiment. Taking the LTE system as an example, the process of releasing the network connection may specifically include the following steps.

In Step 3011, the mobile terminal sends a detach request to the access network device.

In the embodiment of the present disclosure, after the mobile terminal receives the instruction for reducing power consumption, the mobile terminal may send an uplink non-access stratum transfer message (UL NAS transfer) to the access network device, and the UL NAS transfer message may include the detach request. The detach request instructs the mobile terminal to be disconnected from the access network device.

In Step 3012, the access network device sends a detach accept message to the mobile terminal.

After the access network device receives the UL NAS transfer message sent by the mobile terminal, the access network device may send a downlink non-access stratum transfer message (DL NAS transfer) to the mobile terminal, and the DL NAS transfer message includes the detach accept message.

In Step 3013, the access network device sends a radio resource connection release message to the mobile terminal.

After the access network device sends the DL NAS transfer message to the mobile terminal, the access network device may continue to send the radio resource connection release message (RRC Connection Release) to the mobile terminal. After the mobile terminal receives the radio resource connection release message, the mobile terminal may determine that the network connection with the access network is released, that is, the detachment is successfully performed.

In Step 302: a baseband-chip related communication parameter in the mobile terminal is adjusted, to reduce the power consumption of the mobile terminal.

After the mobile terminal determines that the network connection with the access network is released, the mobile terminal may adjust its baseband-chip related communication parameter to reduce the power consumption of the baseband chip. The baseband-chip related communication parameter in the mobile terminal may include at least one of the number of operable antennas, a carrier aggregation function, a multiple-input multiple-output parameter, a throughput rate of the mobile terminal, and a communication protocol version. Correspondingly, reference may be made to Table 1 for a manner in which a mobile terminal adjusts the baseband-chip related communication parameter. As shown in Table 1, when the communication parameter to be adjusted includes the number of operable antennas, the mobile terminal may reduce the number of the operable antennas. When the communication parameter to be adjusted includes the carrier aggregation function, the mobile terminal may disable the carrier aggregation function. When the communication parameter to be adjusted includes the multiple-input multiple-output parameter, the mobile terminal may reduce the number of data streams sent and received by the operable antennas. When the communication parameter to be adjusted includes the throughput rate of the mobile terminal, the mobile terminal may reduce the throughput rate of the mobile terminal. When the communication parameter to be adjusted includes the communication protocol version, the mobile terminal may lower the communication protocol version.

TABLE 1

| baseband-chip related communication parameter (power consumption from high to low) | adjustment manner |
| --- | --- |
| number of operable antennas | reducing the number of the operable antennas |
| carrier aggregation function | disabling the carrier aggregation function |
| multiple-input multiple-output parameter | reducing the number of data streams sent and received by the operable antennas |
| throughput rate of the mobile terminal | reducing the throughput rate of the mobile terminal |
| communication protocol version | lowering the communication protocol version |

The operable antenna refers to an antenna that can be used to receive and send data (that is, in an operation state) among a plurality of antennas that are preset in the mobile terminal, and the mobile terminal may adjust the operating state of each of the plurality of antennas, and in turn, adjust the number of the operable antennas. For example, if four antennas are currently provided in the mobile terminal and all of the four antennas are in the operable state, when the terminal adjusts the number of operable antennas, the mobile terminal may turn off some of the operable antennas. The carrier aggregation function refers to the function that the mobile terminal aggregates multiple carriers to improve data transmission rate and bandwidth. When the mobile terminal enables the carrier aggregation function, the data transmission rate and the bandwidth of the baseband chip may be greatly increased. The multiple-input multiple-output parameter refers to the number of data streams that the operable antennas can send and receive when data is exchanged between the mobile terminal and the access network device. For example, if four antennas are provided in the mobile terminal and all of the four antennas are in the operable state, when the mobile terminal maintains the current number of operable antennas, the data streams that the four operable antennas can receive are 4 channels. When the mobile terminal adjusts the multiple-input multiple-output parameter, the mobile terminal may turn off some of the data streams. The throughput rate of the mobile terminal refers to, when the mobile terminal performs data exchange with the access network device, an average rate of data passing through each communication channel or each node per unit time. The throughput rate may be divided into different categories according to the magnitude of the throughput rate. The smaller the throughput rate of the mobile terminal is, the lower the corresponding throughput rate category is. For example, if the current category of the throughput rate of the mobile terminal is 4, when the mobile terminal adjusts its throughput rate, the mobile terminal may adjust the category of its throughput rate from 4 to 2. The communication protocol version refers to a release version of the communication protocol based on which the mobile terminal and the access network device perform data exchange. The higher the version of the communication protocol is, the stronger the communication capability of the baseband chip is. For example, if the current communication protocol version of the mobile terminal is release 14 (that is, the release version of the communication protocol is version 14), the mobile terminal may lower the communication protocol version to release 8 (that is, the release version of the communication protocol is version 8) when the mobile terminal adjusts its communication protocol version.

In the embodiment of the present disclosure, when the mobile terminal adjusts its baseband-chip related communication parameter, the mobile terminal may determine the number of and the adjustment magnitude of communication parameters to be adjusted according to the detected battery level. The number of communication parameters to be adjusted may be negatively correlated to the battery level of the mobile terminal. The adjustment magnitude of the communication parameter to be adjusted may also be negatively correlated to the battery level indicated by the battery level information. That is, the lower battery level detected by the mobile terminal is, the larger the number of communication parameters to be adjusted is, and the larger the adjustment magnitude is. In practical application, the mobile terminal may pre-store a correspondence between battery levels and numbers of baseband-chip related communication parameters to be adjusted, as shown in Table 2. When the battery level of the mobile terminal is within the interval (15%, 20%], the number of baseband-chip related communication parameters to be adjusted is one. When the battery level of the mobile terminal is within the interval (10%, 15%], the number of baseband-chip related communication parameters to be adjusted is two. When the battery level of the mobile terminal is within the interval (5%, 10%], the number of baseband-chip related communication parameters to be adjusted is four. When the battery level of the mobile terminal is within the interval (0%, 5%], the number of baseband-chip related communication parameters to be adjusted is five.

TABLE 2

| battery level of the mobile terminal | number of baseband-chip related communication parameters to be adjusted |
| --- | --- |
| (15%, 20%] | one |
| (10%, 15%] | two |
| (5%, 10%] | four |
| [0, 5%] | five |

Further, after the mobile terminal determines that the number of baseband-chip related communication parameters to be adjusted is N, the mobile terminal needs to further determine a specific communication parameter to be adjusted. In an example, the mobile terminal may determine N communication parameters randomly from its baseband-chip related communication parameters for adjustment. In an example, the mobile terminal may also determine the communication parameter to be adjusted according to the previously recorded power consumption of the communication capability corresponding to each baseband-chip related communication parameter. For example, the mobile terminal may sort each communication parameter according to the power consumption of the communication capability corresponding to the communication parameter related to each baseband chip in a high to low order. When the mobile terminal determines the communication parameter to be adjusted, the mobile terminal may select from the sorted communication parameters, first N parameters with the highest power consumption, to be adjusted. That is, when the mobile terminal adjusts its baseband-chip related communication parameter, the mobile terminal adjusts the communication parameter with higher power consumption in priority. Then, the mobile terminal may determine the adjustment magnitude of the baseband-chip related communication parameter to be adjusted according to the battery level of the mobile terminal.

As an example, it is assumed that the order of the power consumption of the communication capability corresponding to each communication parameter in the mobile terminal is as shown in Table 1. If the mobile terminal detects that the current battery level of the mobile terminal is 18%, according to the correspondence shown in Table 2, the number of communication parameters to be adjusted is one, and then according to the order of power consumption shown in Table 1, the mobile terminal may determine the communication parameter to be adjusted as: the number of operable antennas. The mobile terminal may determine the adjustment magnitude of the number of operable antennas according to the battery level of the mobile terminal as: 2, and the corresponding adjustment manner as: reducing the number of operable antennas form 4 to 2. When the mobile terminal detects that the current battery level is 8%, according to the correspondence of Table 2, the number of communication parameters to be adjusted is four, and it may be determined from Table 1, that the communication parameters to be adjusted are: the number of operable antennas, a carrier aggregation function, a multiple-input multiple-output parameter, and a throughput rate of a mobile terminal. Further, the mobile terminal may determine the adjustment magnitude of each communication parameter to be adjusted according to the battery level of the mobile terminal as follows: reducing the number of operable antennas from 4 to 1; disabling the carrier aggregation function; reducing the number of data streams sent and received by the operable antennas from 4 to 1; and reducing the throughput rate of the mobile terminal from category 4 to category 2. The corresponding adjustment manner may be: reducing the number of operable antennas from 4 to 1; disabling the carrier aggregation function; reducing the number of data streams sent and received by the operable antennas from 4 to 1; and reducing the throughput rate of the mobile terminal from category 4 to category 2.

In Step 303, the access network is reconnected, and during the connecting process, the adjusted communication parameter is sent to the access network device of the access network.

In the embodiment of the present disclosure, after the mobile terminal adjusts the baseband-chip related communication parameter, the mobile terminal may be reconnected to the access network, to ensure that the mobile terminal can implement its communication function with the adjusted communication parameter. As shown in FIG. 3-3, the process of reconnecting the mobile terminal to the access network may include the following steps.

In Step 3031, the mobile terminal sends a random access message to the access network device.

In the embodiment of the present disclosure, after the mobile terminal adjusts the baseband-chip related communication parameter, the mobile terminal sends a random access message to the access network device.

In Step 3032, the access network device sends a random access response message to the mobile terminal.

After receiving the random access message, the access network device sends a random access response message (Random Access Response) to the mobile terminal.

In Step 3033, the mobile terminal sends a radio resource connection request to the access network device.

After receiving the random access response message, the mobile terminal sends a radio resource connection request (RRC Connection Request) to the access network device.

In Step 3034, the access network device sends a radio resource connection setup message to the mobile terminal.

After receiving the radio resource connection request, the access network device may send a radio resource connection setup message (RRC Connection Setup) to the mobile terminal.

In Step 3035, the mobile terminal sends a radio resource connection setup complete message to the access network device.

After receiving the radio resource connection setup message, the mobile terminal sends a radio resource connection setup complete message (RRC Connection Setup Complete) to the access network device. The message contains an Attach Request message.

In Step 3036: the access network device sends an UE capability enquiry request to the mobile terminal.

When receiving the radio resource connection setup complete message sent by the mobile terminal, the access network device sends an UE capability enquiry request (UE Capacity Enquiry) to the mobile terminal. The UE capability enquiry request may include a communication parameter acquisition request.

In Step 3037, the mobile terminal sends the adjusted baseband-chip related communication parameter in the mobile terminal to the access network device.

The mobile terminal may send to the access network device the baseband-chip related communication parameter adjusted after the mobile terminal network releases the connection with the access network, such that the access network device may perform data with the mobile terminal according to the adjusted communication parameter. Since the power consumption of the baseband chip after the communication parameter is adjusted is relatively low, correspondingly, the processing resources of the processor occupied by the baseband chip are reduced, thereby reducing the power consumption of the processor and further effectively reducing the power consumption of the mobile terminal.

As an example, the adjusted baseband-chip related communication parameter sent from the mobile terminal to the access network device may be: one operable antenna, carrier aggregation function being disabled, the multiple-input multiple output parameter being 1 channel, and the throughput rate category of the mobile terminal being category 2.

It should be noted that after the mobile terminal sends the adjusted communication parameter to the access network device, there is still signaling interaction between the mobile terminal and the access network device. Specifically, the access network device sends a security mode command request (Security Mode Command) to the mobile terminal for security activation. After receiving the security mode command request, the mobile terminal sends a security mode complete message (Security Mode Complete) to the access network device. After receiving the security mode complete message, the access network device sends a radio resource connection reconfiguration message (RRC Connection Reconfig.) to the mobile terminal for reconfiguring radio resources for the mobile terminal. The radio resource connection reconfiguration message includes an attach request, and the attach request includes a radio resource configuration related parameter. After receiving the radio resource connection reconfiguration message, the mobile terminal sends a RRC connection reconfiguration complete message (RRC Connection Reconfig. Complete) to the access network device. After the mobile terminal completes the RRC connection reconfiguration, the mobile terminal sends an UL direct transfer message (UL direct transfer) to the access network device, and the UL direct transfer message includes a non-access stratum (i.e. NAS) attach complete message (Attach Complete) and the like. That is, the RRC connection reconfiguration is completed. As a result, the mobile terminal completes the process of connecting to the access network.

In Step 304, after the access network is reconnected, when it is detected that the battery level of the mobile terminal is greater than a preset power threshold, the network connection with the access network is released.

After the mobile terminal is reconnected to the access network, the mobile terminal may continue to detect the battery level of the mobile terminal. When detecting that the battery level of the mobile terminal is greater than the preset power threshold, the mobile terminal may determine that the current battery level is high, and may support the baseband chip to operate with a higher communication capability. In order to ensure an excellent user experience, the mobile terminal may restore the baseband-chip related communication parameter. Correspondingly, the mobile terminal may once again release the network connection with the access network.

It should be noted that the preset power threshold may be the same as or different from the low battery threshold mentioned in the above step 301. In the embodiments of the present disclosure, the preset power threshold may be greater than the low battery threshold, for example, the low battery threshold may be 20% and the preset power threshold may be 50%.

As an example, assuming that the preset power threshold is 50%, when the mobile terminal adjusts its communication parameter, and detects that its current battery level is greater than 50% after the mobile terminal is reconnected to the access network, the mobile terminal may release the network connection with the access network again.

In Step 305, the baseband-chip related communication parameter in the mobile terminal is restored.

When the mobile terminal detects that its battery level is greater than the preset power threshold, the mobile terminal may determine that the current battery level is relatively high and may support the baseband chip to operate with higher a communication capability. Therefore, in order to ensure an excellent user experience, the mobile terminal may restore the baseband-chip related communication parameter. That is, the baseband-chip related communication parameter in the mobile terminal may be restored to the communication parameter before the adjustment.

With reference to the foregoing manner for the mobile terminal to adjust the baseband-chip related communication parameter, the manner in which the mobile terminal restores the baseband-chip related communication parameter may include: when the communication parameter to be restored includes the number of operable antennas, increasing the number of operable antennas to the number before the adjustment; when the communication parameter to be restored includes the carrier aggregation function, enabling the carrier aggregation function; when the communication parameter to be restored includes the multiple-input multiple-output parameter, increasing the number of the data streams sent and received by the operable antenna to the number before the adjustment; when the communication parameter to be restored includes the throughput rate of the mobile terminal, increasing the category of the throughput rate of the mobile terminal to the category before the adjustment; and when the communication parameter to be restored includes the communication protocol version, increasing the communication protocol version to the version before the adjustment.

As an example, if the baseband-chip related communication parameters in the mobile terminal before the adjustment are: four operable antennas, the carrier aggregation function being enabled, the four operable antennas sending and receiving 4 channels of data streams, and the throughput rate category of the mobile terminal being category 4. Correspondingly, the mobile terminal may restore the number of the operable antennas from 1 to 4, enable the carrier aggregation function, restore the data streams sent and received by the operable antennas from 1 channel to 4 channels, and restore the throughput rate category from category 2 to category 4. Then, the restored baseband-chip related communication parameters in the mobile terminal are: four operable antennas, the carrier aggregation function being enabled, the four operable antennas sending and receiving 4 channels of data streams, and the throughput rate category of the mobile terminal being category 4.

In Step 306, the access network is reconnected, and during the connecting process, the restored communication parameter is sent to the access network device.

In the embodiment of the present disclosure, after the mobile terminal restores the communication parameter, the mobile terminal may be reconnected to the access network to ensure that the mobile terminal can implement its communication function with the pre-adjustment communication parameter to ensure an excellent user experience. The process of reconnecting the mobile terminal to the access network and sending the restored communication parameter to the access network device may refer to the above step 3031 to step 3037, and details will not be repeated herein.

Accordingly, in the method for reducing power consumption of a mobile terminal provided by the embodiment of the present disclosure, the mobile terminal releases network connection with an access network, and then adjusts a baseband-chip related communication parameter, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Figures 1, 4:
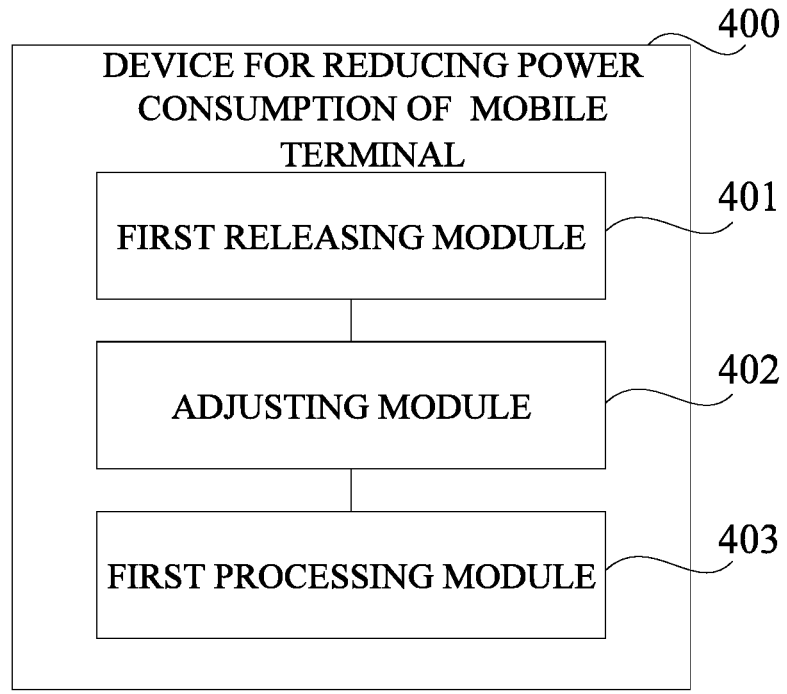
Figures 2, 4:
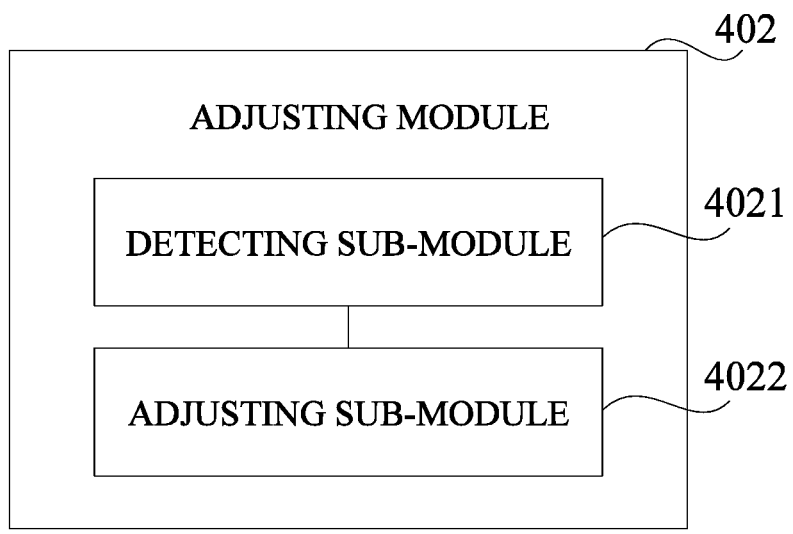
Figures 3, 4:
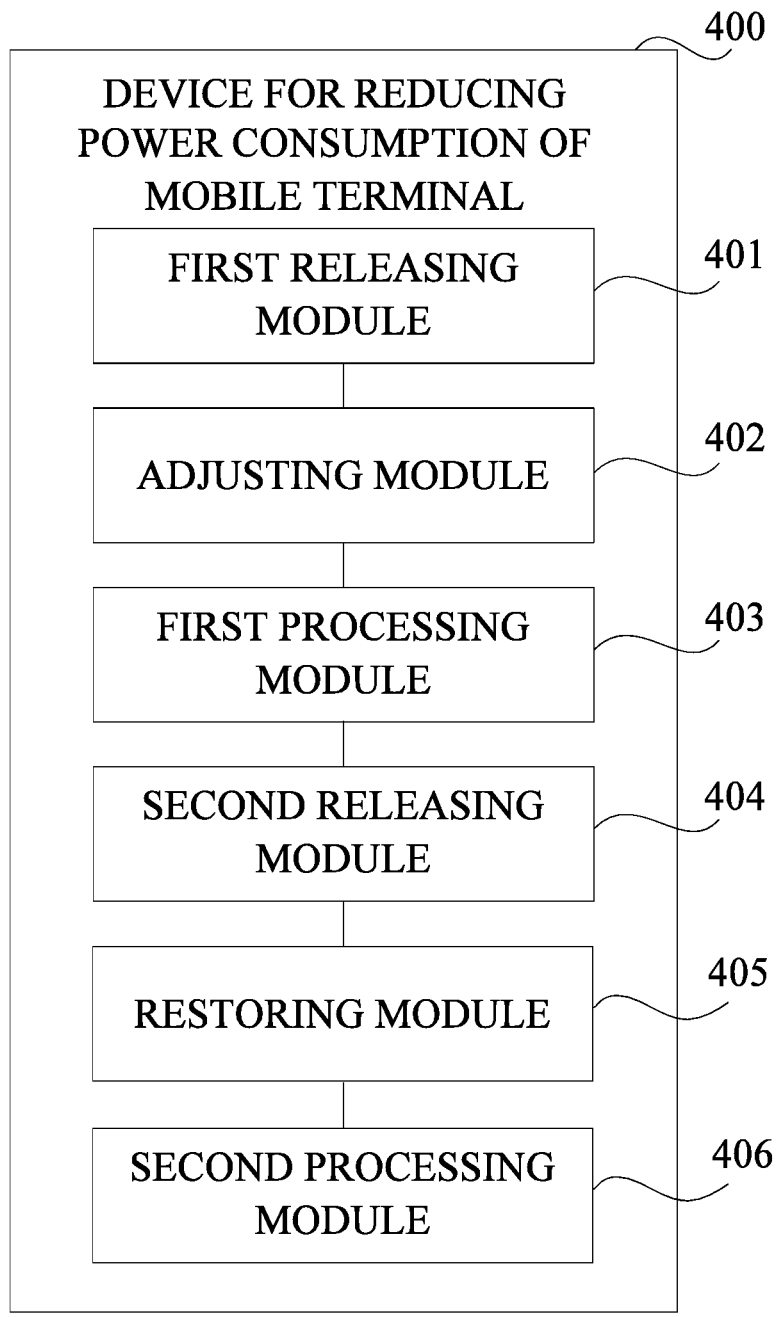
Figure 4:
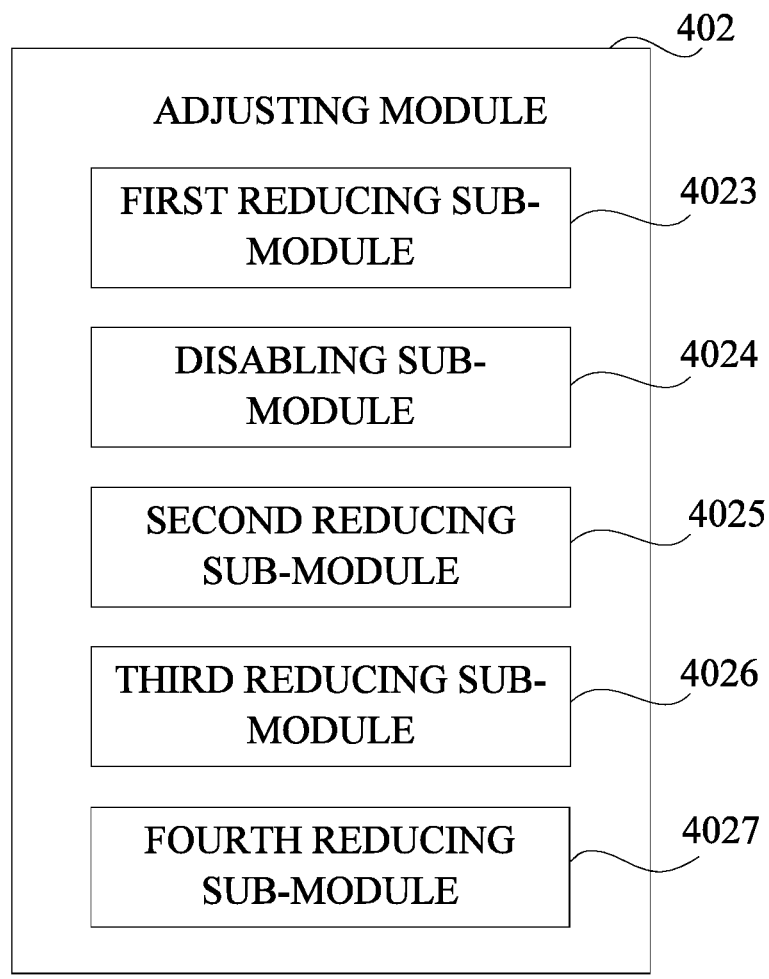

FIG. 4-1 is a block diagram illustrating a device 400 for reducing power consumption of a mobile terminal according to an exemplary embodiment. The device is configured to perform the method for reducing power consumption of a mobile terminal provided by the above embodiment. As shown in FIG. 4-1, the device may include the following components.

A first releasing module 401 is configured to release network connection with an access network in response to a received instruction for reducing power consumption.

An adjusting module 402 is configured to adjust a baseband-chip related communication parameter in the mobile terminal, to reduce the power consumption of the mobile terminal A first processing module 403 is configured to reconnect to the access network, and during the connecting process, send the adjusted communication parameter to an access network device of the access network.

Accordingly, in the device for reducing power consumption of a mobile terminal provided by the embodiment of the present disclosure, the device releases network connection with an access network, and then adjusts a baseband-chip related communication parameter, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

Optionally, FIG. 4-2 is a block diagram illustrating the adjusting module 402 according to an exemplary embodiment. As shown in FIG. 4-2, the adjusting module 402 may specifically include the following components.

A detecting sub-module 4021 is configured to detect a battery level of the mobile terminal.

An adjusting sub-module 4022 is configured to adjust the communication parameter according to the battery level of the mobile terminal, wherein the number of communication parameters to be adjusted is negatively correlated to the battery level of the mobile terminal.

Optionally, FIG. 4-3 is a block diagram illustrating another device 400 for reducing power consumption of a mobile terminal according to an exemplary embodiment. As shown in FIG. 4-3, the device may also include the following components.

A second releasing module 404 is configured to, after the access network is reconnected, when it is detected that the battery level of the mobile terminal is greater than a preset power threshold, release network connection with the access network.

A restoring module 405 is configured to restore the baseband-chip related communication parameter in the mobile terminal.

A second processing module 406 is configured to reconnect to the access network, and during the connecting process, send the restored communication parameter to the access network device.

Optionally, the baseband-chip related communication parameter in the mobile terminal includes at least one of the number of operable antennas, a carrier aggregation function, a multiple-input multiple-output parameter, a throughput rate of the mobile terminal and a communication protocol version.

Optionally, FIG. 4-4 is a block diagram illustrating the adjusting module 402 according to an exemplary embodiment. As shown in FIG. 4-4, the adjusting module 402 may specifically include the following components.

A first reducing sub-module 4023 is configured to, when the communication parameter to be adjusted includes the number of operable antennas, reduce the number of operable antennas.

A disabling sub-module 4024 is configured to, when the communication parameter to be adjusted includes the carrier aggregation function, disable the carrier aggregation function.

A second reducing sub-module 4025 is configured to, when the communication parameter to be adjusted includes the multiple-input multiple-output parameter, reduce the number of data streams sent and received by the operable antennas.

A third reducing sub-module 4026 is configured to, when the communication parameter to be adjusted includes the throughput rate of the mobile terminal, reduce the throughput rate of the mobile terminal.

A fourth reducing sub-module 4027 is configured to, when the communication parameter to be adjusted includes the communication protocol version, lower the communication protocol version.

Figures 4, 5:
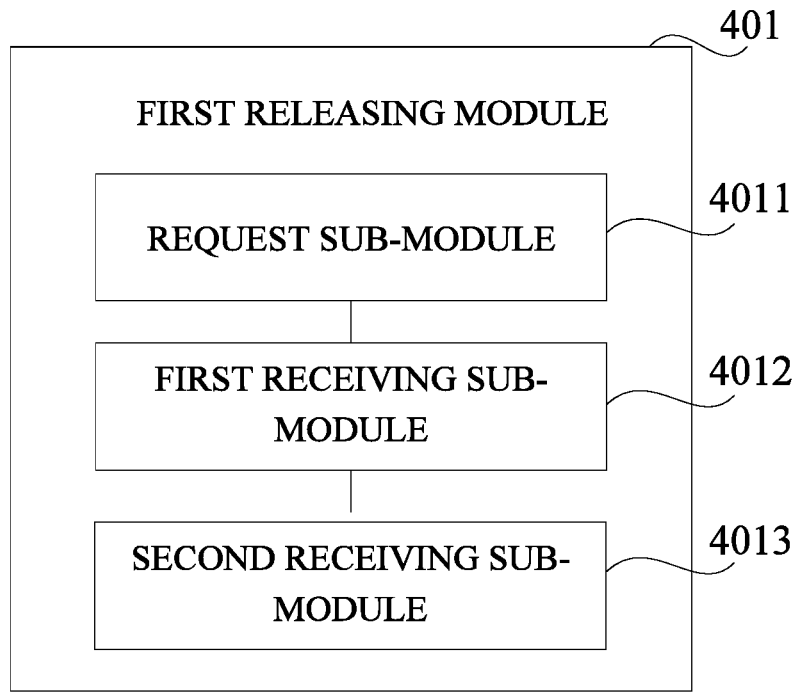

Optionally, FIG. 4-5 is a block diagram illustrating the first releasing module 401 according to an exemplary embodiment. As shown in FIG. 4-5, the first releasing module 401 may specifically include the following components.

A request sub-module 4011 is configured to send a detach request to the access network device.

A first receiving sub-module 4012 is configured to receive a detach accept message sent by the access network device.

A second receiving sub-module 4013 is configured to receive a radio resource connection release message sent by the access network device.

Figures 4, 5, 6:
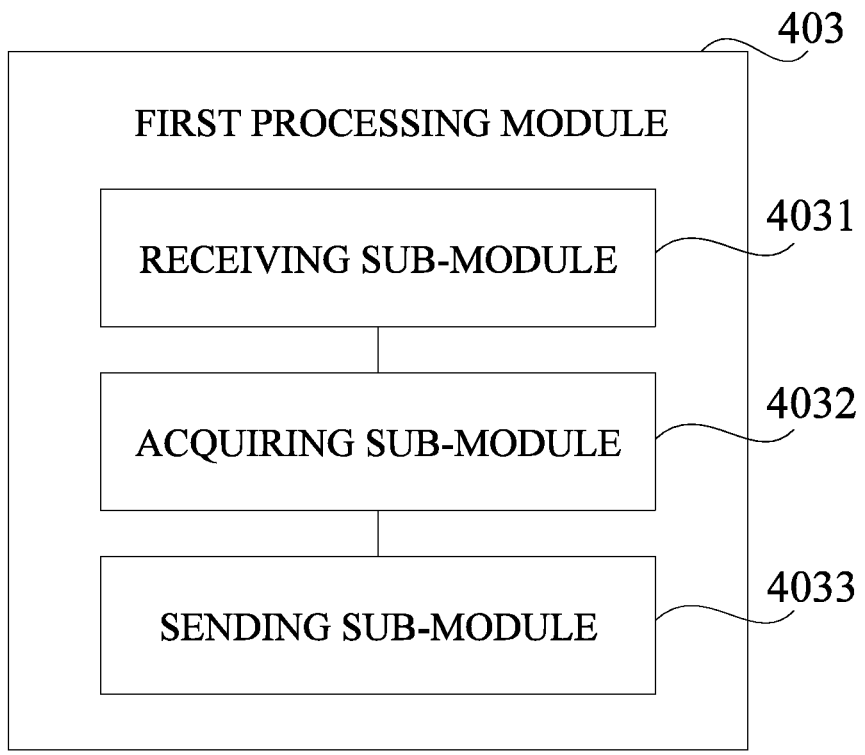
Figure 5:
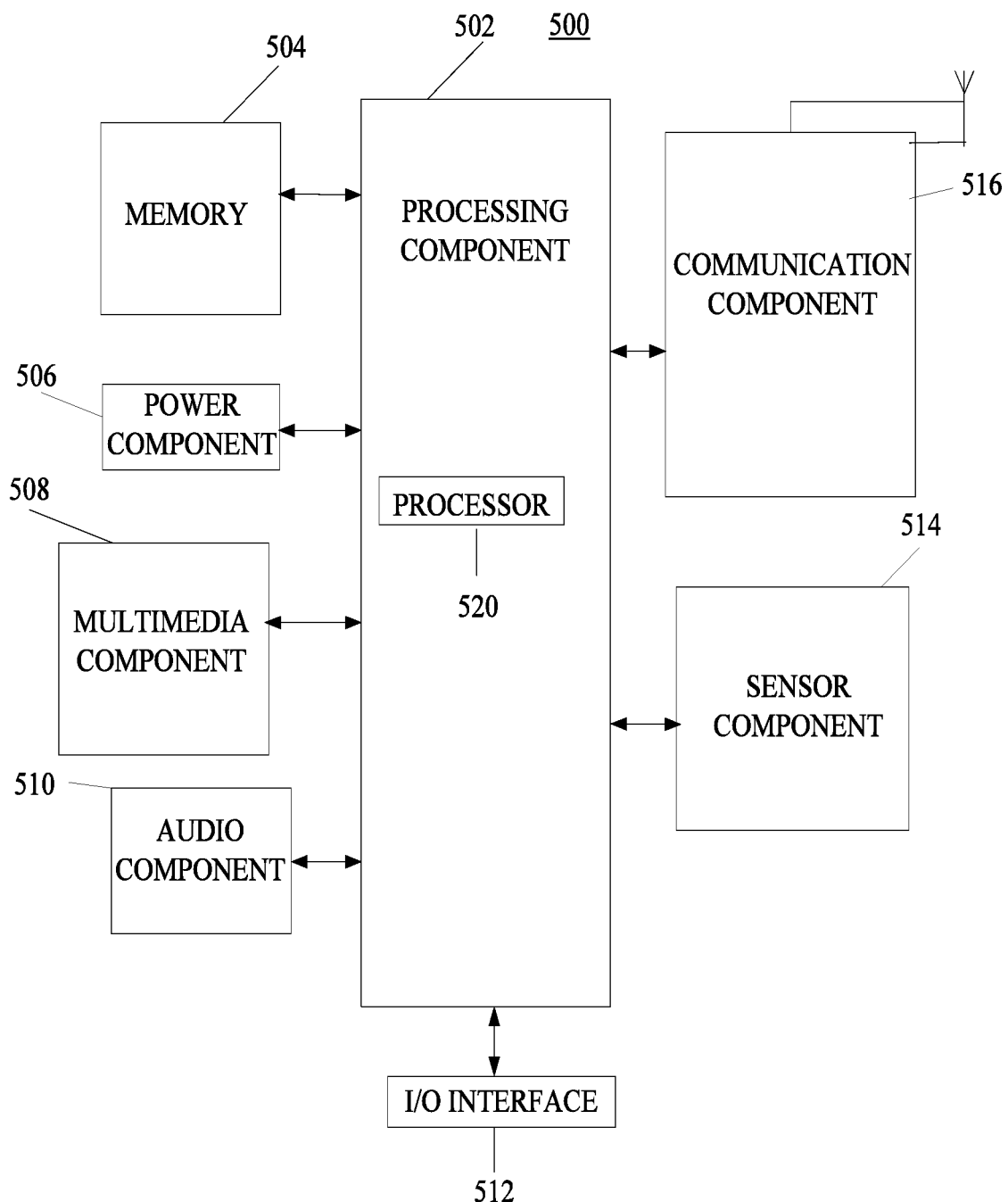

Optionally, FIG. 4-6 is a block diagram illustrating the first processing module 403 according to an exemplary embodiment. As shown in FIG. 4-6, the first processing module 403 may specifically include the following components.

A receiving sub-module 4031 is configured to receive an UE capability enquiry request sent by the access network device.

An acquiring sub-module 4032 is configured to acquire the adjusted communication parameter of the baseband chip in the mobile terminal.

A sending sub-module 4033 is configured to send the adjusted communication parameter to the access network device.

Accordingly, in the device for reducing power consumption of a mobile terminal provided by the embodiment of the present disclosure, the device releases network connection with an access network, and then adjusts a baseband-chip related communication parameter, to reduce the power consumption of the baseband chip in the mobile terminal. Correspondingly, it can also reduce the processing resources of the processor occupied by the baseband chip, thereby reducing the power consumption of the processor. Due to the large power consumption of the baseband chip in the mobile terminal, reducing the power consumption of the baseband chip can effectively reduce the power consumption of the mobile terminal.

With respect to the device in the foregoing embodiment, a specific manner in which each module performs an operation has been described in detail in the embodiments related to the method, and will not be described in detail herein.

FIG. 5 is a block diagram illustrating a mobile terminal 500 according to an exemplary embodiment. For example, the mobile terminal 500 may be a mobile phone, a computer, a digital broadcast terminal, a messaging device, a gaming console, a tablet, a medical device, exercise equipment, a personal digital assistant, and the like.

Referring to FIG. 5, the mobile terminal 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the mobile terminal 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the mobile terminal 500. Examples of such data include instructions for any applications or methods operated on the mobile terminal 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the mobile terminal 500. The power component 506 may include a power management system, one or more power sources, and any other components associated with the generation, management, and distribution of power in the mobile terminal 500.

The multimedia component 508 includes a screen providing an output interface between the mobile terminal 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the mobile terminal 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the mobile terminal 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the mobile terminal 500. For instance, the sensor component 514 may detect an open/closed status of the mobile terminal 500, relative positioning of components, e.g., the display and the keypad of the mobile terminal 500. The sensor component 514 may also detect a change in position of the mobile terminal 500 or a component of the mobile terminal 500, a presence or absence of user contact with the mobile terminal 500, an orientation or an acceleration/deceleration of the mobile terminal 500, and a change in temperature of the mobile terminal 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the mobile terminal 500 and other devices. The mobile terminal 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the mobile terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the mobile terminal 500, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, when instructions in the storage medium are executed by a processor of the mobile terminal 500, enables the mobile terminal 500 to perform the method for reducing power consumption of a mobile terminal provided by the above embodiment.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and embodiments be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for reducing power consumption of a terminal device, comprising:
    releasing, by processing circuitry of an apparatus, wireless network connection of the terminal device from a network in response to an instruction for reducing the power consumption of the terminal device, the terminal device receiving wireless communication service from the network;
    after releasing the wireless network connection of the terminal device from the network, adjusting, by the processing circuitry, a subset of communication parameters from at least one first setting to at least one second setting to reduce power consumption of a baseband processing device in the terminal device, the communication parameters being associated with the baseband processing device;
    after adjusting the subset of communication parameters, reestablishing the wireless network connection of the terminal device to the network based on the at least one second setting of the subset of communication parameters; and
    when the wireless network connection is being reestablished, sending, by interface circuitry of the apparatus, the adjusted communication parameters to an access device in the network.

2. The method according to claim 1, wherein adjusting the subset of the communication parameters comprises:
    detecting, by the processing circuitry, a present battery capacity of the terminal device; and
    adjusting, by the processing circuitry, the subset of the communication parameters according to the present battery capacity.

3. The method according to claim 2, further comprising:
    adjusting a number of the subset of the communication parameters according to the present battery capacity, the number of the subset of the communication parameters being negatively correlated to the present battery capacity.

4. The method according to claim 1, further comprising:
    after reestablishing the wireless network connection of the terminal device to the network, detecting a present battery capacity;
    when the present battery capacity is determined to be greater than a preset battery threshold, releasing the wireless network connection of the terminal device from the network;
    restoring the subset of the communication parameters to the respective first settings; and
    reestablishing the wireless network connection of the terminal device to the network; and
    when the wireless network connection is being reestablished, sending the restored subset of communication parameters to the access device.

5. The method according to claim 1, wherein the subset of the communication parameters used by the terminal device to communicate with the network comprises at least one of:
    a first parameter indicative of a number of at least one operable antenna configured to communicate with the network;
    a second parameter associated with carrier aggregation that combines multiple carriers to receive data from and send data to the network;
    a third parameter indicative of a multiple-input multiple-output characteristic that controls a number of data streams received and sent by the at least one operable antenna;
    a fourth parameter indicative of a data throughput rate of the terminal device; and
    a fifth parameter indicative of a communication protocol version used by the terminal device.

6. The method according to claim 5, wherein adjusting the subset of the communication parameters comprises:
    when the subset of the communication parameters includes the first parameter, reducing the number of the at least one operable antenna;
    when the subset of the communication parameters includes the second parameter, disabling the carrier aggregation;
    when the subset of the communication parameters includes the third parameter, reducing the number of data streams received and sent by the at least one operable antenna;
    when the subset of the communication parameters includes the fourth parameter, reducing the data throughput rate of the terminal device; and
    when the subset of the communication parameters includes the fifth parameter, lowering the communication protocol version.

7. The method according to claim 1, wherein releasing the wireless network connection comprises:
    sending a detach request to the access device requesting that the terminal device is to be detached from the network;
    receiving a detach accept message from the access device; and
    receiving a connection release message from the access device.

8. The method according to claim 1, wherein sending the adjusted communication parameters comprises:
    receiving, from the access device, a request to obtain the communication parameters;
    acquiring the adjusted communication parameters; and
    sending the adjusted communication parameters to the access device.

9. The method according to claim 3, further comprising:
    after determining the number of the subset of the communication parameters, determining the subset of the communication parameters to be adjusted based on power consumption levels associated with operating the baseband processing device according to the respective communication parameters.

10. The method according to claim 3, further comprising:
storing a relationship between the present battery capacity and the number of the subset of the communication parameters to be adjusted in the terminal device.

11. An apparatus for reducing power consumption of a terminal device, comprising:
processing circuitry configured to:
release wireless network connection of the terminal device from a network in response to an instruction for reducing the power consumption of the terminal device, the terminal device receiving wireless communication service from the network;
after releasing the wireless network connection of the terminal device from the network, adjust a subset of communication parameters from at least one first setting to at least one second setting to reduce the power consumption of the terminal device, the communication parameters being associated with a baseband processing device in the terminal device; and
after adjusting the subset of communication parameters, reestablish the wireless network connection of the terminal device to the network based on the at least one second setting of the subset of communication parameters; and
interface circuitry configured to:
when the wireless network connection is being reestablished, send the adjusted communication parameters to an access device in the network.

12. The apparatus according to claim 11, wherein the processing circuitry is further configured to:
detect a present battery capacity of the terminal device; and
adjust the subset of the communication parameters according to the present battery capacity.

13. The apparatus according to claim 12, wherein the processing circuitry is further configured to:
adjust a number of the subset of the communication parameters according to the present battery capacity, the number of the subset of the communication parameters being negatively correlated to the present battery capacity.

14. The apparatus according to claim 11, wherein the processing circuitry is further configured to:
after reestablishing the wireless network connection of the terminal device to the network, detect a present battery capacity;
when the present battery capacity is determined to be greater than a preset battery threshold, release the wireless network connection of the terminal device from the network;
restore the subset of the communication parameters to the respective first settings; and
reestablish the wireless network connection of the terminal device to the network; and
the interface circuitry is further configured to:
when the wireless network connection is being reestablished, send the restored subset of communication parameters to the access device.

15. The apparatus according to claim 11, wherein the subset of the communication parameters used by the terminal device to communicate with the network comprises at least one of:
a first parameter indicative of a number of at least one operable antenna configured to communicate with the network;
a second parameter associated with carrier aggregation that combines multiple carriers to receive data from and send data to the network;
a third parameter indicative of a multiple-input multiple-output characteristic that controls a number of data streams received and sent by the at least one operable antenna;
a fourth parameter indicative of a data throughput rate of the terminal device; and
a fifth parameter indicative of a communication protocol version used by the terminal device.

16. The apparatus according to claim 15, wherein the processing circuitry is configured to:
when the subset of the communication parameters includes the first parameter, reduce the number of the at least one operable antenna;
when the subset of the communication parameters includes the second parameter, disable the carrier aggregation;
when the subset of the communication parameters includes the third parameter, reduce the number of data streams received and sent by the at least one operable antenna;
when the subset of the communication parameters includes the fourth parameter, reduce the data throughput rate of the terminal device; and
when the subset of the communication parameters includes the fifth parameter, lower the communication protocol version.

17. The apparatus according to claim 11, wherein the interface circuitry is configured to:
send a detach request to the access device requesting that the terminal device is to be detached from the network;
receive a detach accept message from the access device; and
receive a connection release message from the access device.

18. The apparatus according to claim 11, wherein the interface circuitry is configured to:
receive, from the access device, a request to obtain the communication parameters; and
send the adjusted communication parameters to the access device; and
the processing circuitry is configured to:
acquire the adjusted communication parameters.

19. The apparatus according to claim 13, wherein the processing circuitry is configured to:
after determining the number of the subset of the communication parameters, determine the subset of the communication parameters to be adjusted based on power consumption levels associated with operating the baseband processing device according to the respective communication parameters.

20. A non-transitory computer-readable storage medium storing a program executable by a processor to perform:
releasing wireless network connection of a terminal device from a network in response to an instruction for reducing power consumption of the terminal device, the terminal device receiving wireless communication service from the network;
after releasing the wireless network connection of the terminal device from the network, adjusting a subset of communication parameters from at least one first setting to at least one second setting to reduce the power consumption of the terminal device, the communication parameters being associated with a baseband processing device in the terminal device;

after adjusting the subset of communication parameters, reestablishing the wireless network connection of the terminal device to the network based on the at least one second setting of the subset of communication parameters; and when the wireless network connection is being reestablished, sending the adjusted communication parameters to an access device in the network.

* * * * *